(12) United States Patent
Kewitsch

(10) Patent No.: US 12,399,328 B2
(45) Date of Patent: Aug. 26, 2025

(54) AUTOMATED FIBER OPTIC INTERCONNECTION SYSTEM BASED ON NON REPEATING BRAID ALGORITHM, ROBOT, AND FIXED, IDENTICAL LENGTH OPTICAL FIBERS

(71) Applicant: Telescent Inc., Irvine, CA (US)

(72) Inventor: Anthony Stephen Kewitsch, Santa Monica, CA (US)

(73) Assignee: Telescent Inc., Irvine, CA (US)

( * ) Notice: Subject to any disclaimer, the term of this patent is extended or adjusted under 35 U.S.C. 154(b) by 1220 days.

(21) Appl. No.: 17/100,830

(22) Filed: Nov. 21, 2020

(65) Prior Publication Data

US 2021/0101233 A1 Apr. 8, 2021

Related U.S. Application Data

(63) Continuation of application No. PCT/IB2019/053960, filed on May 14, 2019.
(Continued)

(51) Int. Cl.
*G02B 6/35* (2006.01)
*B23P 19/04* (2006.01)
(Continued)

(52) U.S. Cl.
CPC .............. *G02B 6/3502* (2013.01); *B23P 19/04* (2013.01); *G02B 6/3508* (2013.01);
(Continued)

(58) Field of Classification Search
None
See application file for complete search history.

(56) References Cited

U.S. PATENT DOCUMENTS 5,167,382 A * 12/1992 Rochester ............ G02B 6/4457
102/504
5,341,448 A * 8/1994 Huebscher ........... G02B 6/3809
385/68
(Continued)

FOREIGN PATENT DOCUMENTS

| WO | 2021021280 A1 | 2/2021 |
| WO | 2021046227 A1 | 3/2021 |
| WO | 2021158492 A1 | 8/2021 |

OTHER PUBLICATIONS

WIPO, International Search Report from International Application No. PCT/IB2019/053960, Oct. 8, 2019. (4 pages).
(Continued)

*Primary Examiner* — Hung K Vu
(74) *Attorney, Agent, or Firm* — Siritzky Law, PLLC

(57) ABSTRACT

A fiber optic strand distribution system utilizing a fiber optic reconfiguration robot moving in xyz directions within a fiber interconnect zone. The system includes a multiplicity of substantially equal length, substantially straight-line fiber strands in an x-z plane within the fiber interconnect zone; each fiber strand having a fixed, central point that lies in proximity to adjacent fiber strands at a distal end located within a linear, central backbone oriented parallel to a y axis; and each fiber strand having a moveable endpoint at a proximal end when engaged by the reconfiguration robot, wherein said moveable endpoint it is moveable between rearrangeable terminal locations along a partial spherical surface that is substantially equidistant from a midpoint of the linear, central backbone, and wherein the robot carries the moveable endpoint of the fiber strand according to a non-repeating braid algorithm and between terminal locations.

24 Claims, 11 Drawing Sheets

Related U.S. Application Data

(60) Provisional application No. 62/676,719, filed on May 25, 2018.

(51) Int. Cl.
*G02B 6/38* (2006.01)
*G02B 6/42* (2006.01)
*G02B 6/44* (2006.01)
*H01R 43/20* (2006.01)

(52) U.S. Cl.
CPC ............ *G02B 6/3866* (2013.01); *G02B 6/42* (2013.01); *G02B 6/44524* (2023.05); *G02B 6/44528* (2023.05); *H01R 43/20* (2013.01)

(56) References Cited

U.S. PATENT DOCUMENTS

| | | |
|---|---|---|
| 7,289,197 B2 | 10/2007 | Kewitsch |
| 7,315,681 B2 | 1/2008 | Kewitsch |
| 7,460,753 B2 | 12/2008 | Kewitsch |
| 7,665,901 B2 | 2/2010 | Kewitsch |
| 7,920,764 B2 | 4/2011 | Kewitsch |
| 8,068,715 B2 | 11/2011 | Kewitsch |
| 8,150,227 B2 | 4/2012 | Kewitsch |
| 8,428,405 B2 | 4/2013 | Kewitsch |
| 8,463,091 B2 | 6/2013 | Kewitsch |
| 8,480,310 B2 | 7/2013 | Kewitsch |
| 8,488,938 B2 | 7/2013 | Kewitsch et al. |
| 8,554,033 B2 | 10/2013 | Kewitsch |
| 8,805,155 B2 | 8/2014 | Kewitsch |
| 9,052,465 B2 | 6/2015 | Kewitsch |
| 9,052,490 B2 | 6/2015 | Kewitsch |
| 9,110,249 B2 | 8/2015 | Kewitsch |
| 9,188,748 B2 | 11/2015 | Kewitsch |
| 9,411,108 B2 | 8/2016 | Kewitsch |
| 9,703,060 B2 | 7/2017 | Kewitsch |
| 10,042,122 B2 | 8/2018 | Kewitsch |
| 10,345,526 B2 | 7/2019 | Kewitsch et al. |
| 10,649,149 B2 | 5/2020 | Kewitsch |
| 10,895,691 B2 | 1/2021 | Kewitsch |
| 10,977,458 B2 | 4/2021 | Kewitsch |
| 2004/0062498 A1* | 4/2004 | Del Grosso ........ G02B 6/44528 385/59 |
| 2010/0220953 A1* | 9/2010 | Kewitsch ............. G02B 6/3502 385/17 |
| 2013/0044991 A1 | 2/2013 | Kowalczyk |
| 2013/0196538 A1 | 8/2013 | Takeuchi |
| 2014/0254986 A1* | 9/2014 | Kmit .................. G02B 6/3849 385/55 |
| 2015/0098698 A1* | 4/2015 | Kewitsch ............. G02B 6/3504 398/45 |
| 2019/0293875 A1 | 9/2019 | Kewitsch |
| 2020/0003978 A1 | 1/2020 | Kewitsch |
| 2020/0041725 A1 | 2/2020 | Kewitsch |
| 2020/0358277 A1 | 11/2020 | Kewitsch |
| 2020/0359117 A1 | 11/2020 | Kewitsch |
| 2021/0072483 A1 | 3/2021 | Kewitsch et al. |
| 2021/0101233 A1 | 4/2021 | Kewitsch |
| 2021/0232154 A1 | 7/2021 | Kewitsch |
| 2021/0239910 A1 | 8/2021 | Kewitsch |

OTHER PUBLICATIONS

WIPO, International Preliminary Report on Patentability for International Application No. PCT/IB2019/053960, Dec. 1, 2020. (8 pages).

WIPO, Written Opinion of the International Searching Authority from International Application No. PCT/IB2019/053960, Oct. 8, 2019, . (7 pages).

* cited by examiner

AUTOMATED FIBER OPTIC INTERCONNECTION SYSTEM BASED ON NON REPEATING BRAID ALGORITHM, ROBOT, AND FIXED, IDENTICAL LENGTH OPTICAL FIBERS

RELATED APPLICATIONS

This application is a continuation of PCT PCT/IB2019/053960, filed May 14, 2019, which claims the benefit of U.S. provisional patent application No. 62/676,719; filed May 25, 2018, the entire contents of both of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to automated fiber optic cross-connects for remote provisioning and reconfiguration of fiber optic communication services, particularly those that are deployed within data centers, central offices, huts, or environmentally hardened enclosures/fiber distribution hubs for outdoor installation. Automated cross-connects are provided in compact form with fixed length, substantially straight optical fibers in a reconfigurable interconnect zone and further include a robotic arm to reconfigure straight-line cross-connects around one another without tangling by remote control means.

BACKGROUND

Hundreds of millions of fiber patch-panel ports are installed within data centers and telecommunications centers. Patch-panels are located indoors within environmentally controlled central offices and data centers. Patch-panels are typically mounted in 19" racks along with network and compute gear. Large numbers of such patch-panels are also deployed in relatively small edge data centers and mobile 5G Cloud Radio Access Network (C-RAN) hubs to support a few hundred interconnections.

Additionally, sealed, and hardened patch-panels with integral fiber optic splitters in a Passive Optical Networks (PON) are deployed outside of environmentally controlled facilities and are commonly called Fiber Distribution Hubs (FDHs). FDHs are installed either at ground level, elevated on a pole or below grade. An FDH typically includes hundreds of fiber optic ports and must be sufficiently robust to withstand a wide range of operating temperatures. Current FDHs are manual and passive, including no active electronic components (i.e. no electrical power). They contain fiber optic components including passive fiber optic splitters, connectors, fusion splices, and cables. FDHs are characterized by asymmetrical number of what are called in the art "F1 fibers" (those fibers originating from the Central Office (CO)) and a greater number of "F2 fibers" connecting the FDH to customer or client premises.

Provisioning of high bandwidth services is a typical access network use case, in which a technician connects a pre-installed fiber optic customer cable at a remote FDH to a splitter port which separates the optical signal into multiple branching fibers, each fiber serving a user. Because of the challenge for technicians to organize and troubleshoot the cables and to accurately document their work, fiber reconfigurations within FDHs will quickly become unmanageable. Even if the customer has canceled service, once the fiber optic cable connecting this user is installed at a splitter output port, service providers are reluctant to remove it. Incorrect records result in a high risk of mistakenly disconnecting the wrong customer. As a result, network assets such as Optical Line Terminals (OLTs) are underutilized. Automation is necessary to address these issues and reduce network operation expenditures (OpEx) and capital expenditures (CapEx).

In general, the implementation of automated fiber optic cross-connect systems in controlled offices and un-controlled locations enables the provisioning, testing, and troubleshooting of access telecom networks to be automated. Current technologies such as cross-bar switches scale as $N^2$, where N is the number of ports, significantly limiting their applications. Embodiments hereof provide apparatus and methods to improve the performance of a new type of cross-connect for application to compact systems based on braided fiber optic strands of fixed and substantially identical lengths. The Knots, Braids and Strands (KBS) algorithm (Kewitsch, Journal of Lightwave Technology, Vol. 27, Aug. 1, 2009, pp. 3107-3115) and U.S. Pat. No. 8,068,715 to Kewitsch enables the complexity of the switchable fiber interconnect system to scale linearly with the number of ports. This optimal solution provides significant benefits over traditional cross-bar switches which diverge in complexity and cost as port counts increase.

This solution utilizes a pick-and-place actuator with a single gripper at one end of a robotic arm. The robotic arm is of a narrow width to allow it to descend into the fiber optic interconnect volume without mechanical interference or contact with surrounding fibers. Any fiber can be arbitrarily reconfigured by physically routing it through the surrounding fibers in a manner directed by KBS algorithm instructions generated by a processing unit. The instruction set ensures that the fiber is routed by fully automated means to any and all conceivable combinations, the number of combinations equaling N factorial.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

SUMMARY

Figure 1:
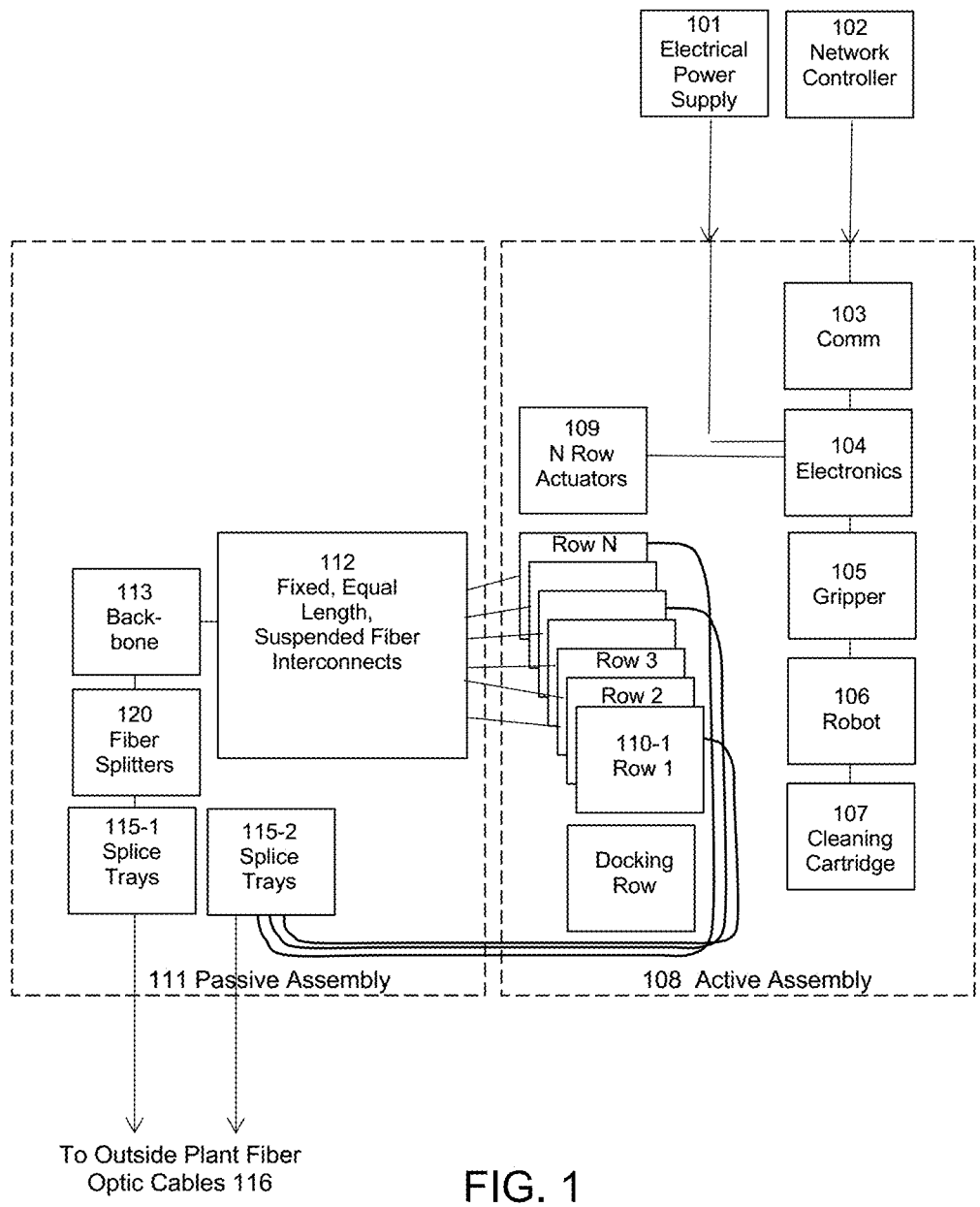
FIG. 1 is a block diagram of an automated FDH according to exemplary embodiments hereof.

The present invention is specified in the claims as well as in the description.

In embodiments hereof, an automated fiber interconnect system utilizing a non-repeating braid algorithm to ensure non-blocking operation, a multiplicity of fibers suspended within the interconnect zone with substantially fixed and identical length, and a robot to transport connectorized ends of fibers are disclosed. Moveable, stacked rows of spaced apart connector tracks distributed along an arc are disclosed in combination with a common linear backbone for the fibers at the nominal center of curvature of the arc. Each connector track includes a mating connector receptacle and mechanical, magnetic features to provide for proper latching and locating of both the pluggable fiber optic connector element and the gripper device. Moveable rows are arranged to maintain substantially identical path lengths from the range of fiber origins along the one-dimensional array at the common linear backbone.

In accordance with aspects and embodiments hereof, the outer diameter of each optical fiber within the interconnect zone is minimized to reduce the maximum dimension of the 1D fiber backbone. That is, to compress its largest dimension. The distance R from center of the 1D fiber backbone to the perpendicular bisector of the row of connectors should be maximized, to minimize potential path length variation among fibers plugged into different ports of the array. In further exemplary embodiments, the center of stacked rows should be positioned along an arc intersecting the plane of the row, so that the centers of the stacked rows are all a nominal distance R from the compressed backbone. This creates a spherical rather than cylindrical arrangement of connectors.

One general aspect includes a fiber optic strand distribution system utilizing a fiber optic reconfiguration robot moving in xyz directions within a fiber interconnect zone, the system including: a multiplicity of substantially equal length, substantially straight-line fiber strands in an xz plane within the fiber interconnect zone; each fiber strand having a fixed, central point that lies in proximity to adjacent fiber strands at a distal end located within a linear, central backbone oriented parallel to a y axis; and each fiber strand having a moveable endpoint at a proximal end when engaged by the reconfiguration robot, where the moveable endpoint it is moveable between rearrangeable terminal locations along a partial spherical surface that is substantially equidistant from a midpoint of the linear, central backbone, and where the robot carries the moveable endpoint of the fiber strand according to a nonrepeating braid algorithm and between terminal locations.

Implementations may include one or more of the following features, alone or in combination:

The system where the robot carries the moveable endpoint of the fiber strand without physically colliding with other fiber strands.

The system where the terminal locations lie along a curvilinear surface substantially constant and equal distance from the linear, central backbone.

The system where sets of terminal locations are attached to a common, rigid substrate.

The system where the terminal location includes a stacked arrangement of one or more sets of terminal locations, the terminal locations of each set being distributed in fixed relation to one another along an arc.

The system where each set of terminal locations is independently rotatable about a common central axis relative to other sets of terminal locations positioned above or below.

The system where a multiplicity of fiber strands is physically merged or fused into a single fiber on a side of the backbone opposite the fiber moveable endpoints.

The system where the multiplicity is in the range 8 to 32.

The system where the fiber strands are terminated with male LC fiber optic connectors and the terminals include female LC union adapters.

Another general aspect includes a method to automate spatial rearrangement of a dense arrangement of fiber optic interconnections of substantially equal lengths plugged into a multi-segmented curved terminal panel, the spatial rearrangement performed by a robot moving in a coordinated sequence of steps according to a nonrepeating braid algorithm, to rearrange any of a multiplicity of fixed, identical length optical fibers, where the method includes: unplugging a connector at one end of an optical fiber at the multi-segmented curved terminal panel; moving the connector in spaces between adjacent connectors; and plugging in the connector at a different location within the multi-segmented curved terminal panel.

Implementations may include one or more of the following features, alone or in combination:

The method where further including cleaning an end face of the optical fiber prior to plugging in the connector at the different location.

The method where the end face of the optical fiber is cleaned immediately prior to plugging in the connector at the different location.

The method where the optical fibers have sufficiently high stiffness and sufficiently low excess length to prevent formation of a circular loop that could tangle with other strands.

The method further including moving the multi-segmented curved terminal panel in a direction orthogonal to the direction of the robot moving in coordinated sequence.

Another general aspect includes a system including a multiplicity of fibers with substantially straight line fiber interconnects of equal length along a central location, the central location spanning a fixed one-dimensional backbone and a two-dimensional curved array of reconfigurable endpoint locations, where each fiber potentially crosses other fibers with no entanglement within the central location.

Implementations may include one or more of the following features, alone or in combination:

The system where each fiber of the multiplicity of fibers is movable by a robot within a surrounding multiplicity of fibers without substantially bending the other fibers.

The system where each substantially straight-line fiber interconnect includes a connector that inserts within reconfigurable endpoint locations.

The system where each fiber is substantially cylindrical, with 80 to 125 micron outer diameter glass and/or 125 to 250 micron outer plastic coating, and/or length of 25 to 500 cm.

The system where the fiber interconnect lengths are identical to within 5% of an average length of the multiplicity of fibers in the central location.

The system where a ratio of length of fiber in the central location to connector array height is greater than 2.

The system where a center of curvature of the two-dimensional curved array lies on the backbone.

The system where a ratio of a length of fiber in the central location to backbone height is greater than 10.

The system where the backbone includes a stacked linear array of reduced outer diameter optical fiber.

The system where the backbone height is less than 3 cm.

Below is a list of system and method or process embodiments. System embodiments will be indicated with a letter "S". Whenever such embodiments are referred to, this will be done by referring to "S" embodiments. Process or method embodiments will be indicated with a letter "M". Whenever such embodiments are referred to, this will be done by referring to "M" embodiments.

S1. A fiber optic strand distribution system utilizing a fiber optic reconfiguration robot moving in xyz directions within a fiber interconnect zone, the system comprising:
  a multiplicity of substantially equal length, substantially straight-line fiber strands in an x-z plane within the fiber interconnect zone;
  each fiber strand having a fixed, central point that lies in proximity to adjacent fiber strands at a distal end located within a linear, central backbone oriented parallel to a y axis; and
  each fiber strand having a moveable endpoint at a proximal end when engaged by the reconfiguration robot, wherein said moveable endpoint it is moveable between rearrangeable terminal locations along a partial spherical surface that is substantially equidistant from a midpoint of the linear, central backbone, and
  wherein the robot carries the moveable endpoint of the fiber strand according to a non-repeating braid algorithm and between terminal locations.

S2. The system of embodiment S1, wherein the robot carries the moveable endpoint of the fiber strand without physically colliding with other fiber strands.

S3. The system of any of embodiments S1-S2, wherein the terminal locations lie along a curvilinear surface substantially constant and equal distance from the linear, central backbone.

S4. The system of any of embodiments S1-S3, wherein sets of terminal locations are attached to a common, rigid substrate.

S5. The system of any of embodiments S1-S4, wherein the terminal location comprises a stacked arrangement of one or more sets of terminal locations, the terminal locations of each set being distributed in fixed relation to one another along an arc.

S6. The system of any of embodiments S1-S5, wherein each set of terminal locations is independently rotatable about a common central axis relative to other sets of terminal locations positioned above or below.

S7. The system of any of embodiments S1-S6, wherein a multiplicity of fiber strands is physically merged or fused into a single fiber on a side of the backbone opposite the fiber moveable endpoints.

S8. The system of embodiments S7, wherein the multiplicity is in the range 8 to 32.

S9. The system of any of embodiments S1-S8, wherein the fiber strands are terminated with male LC fiber optic connectors and the terminals comprise female LC union adapters.

M10. A method to automate spatial rearrangement of a dense arrangement of fiber optic interconnections of substantially equal lengths plugged into a multi-segmented curved terminal panel, said spatial rearrangement performed by a robot moving in a coordinated sequence of steps according to a non-repeating braid algorithm, to rearrange any of a multiplicity of fixed, identical length optical fibers, wherein the method comprises:
  unplugging a connector at one end of an optical fiber at the multi-segmented curved terminal panel;
  moving the connector in spaces between adjacent connectors; and
  plugging in the connector at a different location within the multi-segmented curved terminal panel.

M11. A method according to embodiment M10, further comprising: cleaning an end face of the optical fiber prior to plugging in the connector at said different location.

M12. A method according to embodiment M11, wherein the end face of the optical fiber is cleaned immediately prior to plugging in the connector at said different location.

M13. The method of any of embodiments M10-M12, wherein the optical fibers have sufficiently high stiffness and sufficiently low excess length to prevent formation of a circular loop that could tangle with other strands.

M14. The method of any of embodiments M10-M13, further including: moving the multi-segmented curved terminal panel in a direction orthogonal to the direction of the robot moving in coordinated sequence.

S15. A system comprising a multiplicity of fibers with substantially straight line fiber interconnects of equal length along a central location, the central location spanning a fixed one-dimensional backbone and a two-dimensional curved array of reconfigurable endpoint locations, wherein each fiber potentially crosses other fibers with no entanglement within the central location.

S16. The system of embodiment S15, wherein each fiber of the multiplicity of fibers is movable by a robot within a surrounding multiplicity of fibers without substantially bending the other fibers.

S17. The system of any of embodiments S15-S16, wherein each substantially straight-line fiber interconnect includes a connector that inserts within reconfigurable endpoint locations.

S18. The system of any of embodiments S15-S17, wherein each fiber is substantially cylindrical, with 80 to 125 micron outer diameter glass, 125 to 250 micron outer plastic coating, and length of 25 to 500 cm.

S19. The system of any of embodiments S15-S18, wherein the fiber interconnect lengths are identical to within 5% of an average length of the multiplicity of fibers in the central location.

S20. The system of any of embodiments S15-S19, wherein a ratio of length of fiber in the central location to connector array height is greater than 2.

S21. The system of any of embodiments S15-S20 wherein a center of curvature of the two-dimensional curved array lies on the backbone.

S22. The system of any of embodiments S15-S21, wherein a ratio of a length of fiber in the central location to backbone height is greater than 10.

S23. The system of any of embodiments S15-S22, wherein the backbone comprises a stacked linear array of reduced outer diameter optical fiber.

S24. The system of any of embodiments S15-S23, wherein the backbone height is less than 3 cm.

The above features along are intended to illustrate aspects of the invention but are not intended to limit its scope in any way.

DETAILED DESCRIPTION

Figure 6:
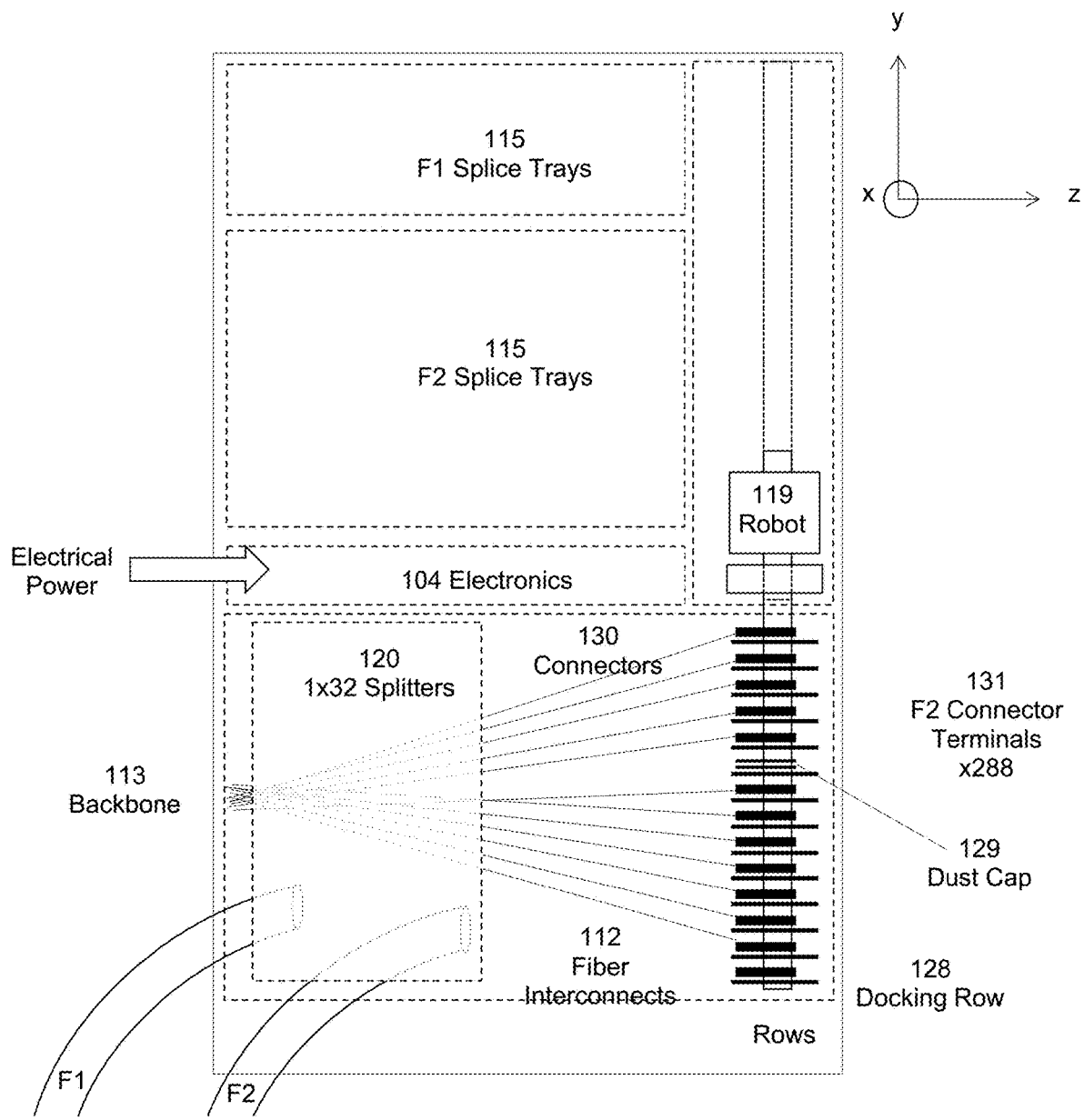
FIG. 6 is a partial cutaway view of an automated FDH according to exemplary embodiments hereof, illustrating an exemplary geometry to accomplish minimal slack buildup for different fiber configurations.

FIG. 1 illustrates a block diagram of an exemplary automated fiber interconnect system with fixed, equal length, internal suspended fiber interconnects 112 that can be interconnected in any arbitrary configuration with all internal fiber interconnects having minimal slack. As a result, there is no entanglement of fibers. In one example, slack (e.g., 123, FIGS. 2, 3) is less than 5 to 10% of the straight-line length. There is a tradeoff between maximum slack, footprint of the unit, and the number of connectors 130 in the system. There are four key aspects to achieve an optimal solution:

1. Optical fiber diameter should be minimized to reduce maximum dimension of 1D fiber backbone (e.g. compress the long dimension of backbone). For example, optical fiber should have 50 or 80 micron glass cladding diameter and 100-125 micron acrylate coating diameter.
2. The distance R from center of 1D fiber backbone to the perpendicular bisector of row of connectors 130 (see FIG. 6) should be maximized, for example, greater than 45.7 cm.
3. The transverse extent of the connector rows 110 from a central plane intersecting and parallel to entire backbone array (e.g. connector spacing multiplied by number of connectors per row) should be less than 25% of R, or, alternatively the connectors 130 should be arranged along an arc of radius R, center of curvature at the backbone, and within the plane of each connector row 110.
4. The center of stacked rows 117 should be positioned along an arc intersecting the plane in which the row lies, so that the centers of stacked rows are all a nominal distance R from the compressed backbone.

The suspended fiber interconnects 112 span a compressed, fixed backbone at one end and a stacked set of rows 117 at the other end, each row having an independent row actuator 109 (e.g. a linear stepper motor) that positions each row in one of three positions (left, right, center). Fibers may be arbitrarily configured therebetween by a robot 106 with gripper 105 and cleaning cartridge 107, without fiber entanglement, colliding with other fibers, or physical clustering eventually leading to entanglement. Physical collision occurs when any pair of fibers wrap around one another and have multiple crossing points.

In accordance with some exemplary embodiments hereof, the automated interconnect system is comprised of electrically active 108 as well as electrically passive subsystems 111. The active 108 subsystem may include the robot 106, row actuator 109, gripper 105, cleaning cartridge 107, and the electronics 104 to control such. The electronics may include an external, remote network controller 102 to send and receive communications 103 at a management port. Power may be supplied to the electronics 104 from either an external power supply 101, such as an electrical power feed supplying AC voltage, or an embedded battery system supplying a DC voltage source with adequate current to drive the multiplicity of actuators in the cross-connect system.

The passive portion/subsystems 111 of the automated interconnect system or FDH may include fiber splice trays 150 to maintain and organize fusion splices between the outside plant cables (F1 from CO to FDH and F2 from FDH to end user) and the FDH. The F2 cables are spliced to pigtails that are externally plugged into connector rows 110-1 . . . N. The F1 cable has a lesser number of fibers, which are individually spliced to the single input port of 1×32 fiber optic splitters 120. The 32 fiber outputs of the splitters are arranged linearly and packed densely at a particular mid-span location to form a segment of the compressed fiber backbone. The splitter outputs are potentially spliced to reduced diameter fibers which are then collected along the 1D array to form a backbone of reduced dimension.

In accordance with some exemplary embodiments hereof, the automated FDH may utilizes a non-repeating braid algorithm [U.S. Pat. No. 8,488,938 to Kewitsch] implemented in software residing on the networked controller. A braid consists of strands that individually cross one another no more than one time, and the strands are optical fibers. This algorithm requires that the multiplicity of fibers of fixed and substantially identical lengths follow substantially straight-line paths for all conceivable cross-connect states.

In a particular example, the system is sized according to customer port capacity (F2 fibers), with the three most common sizes being 144 ports, 288 ports, and 432 ports. In the particular example of a 288 port Automated FDH, the 288 F2 ports serve 288 customers. Assuming a 50% take rate (the fraction of ports actually serving customers at any one time), the automated FDH (A-FDH) would require approximately 144 service carrying fibers (originating from a multiplicity of Optical Line Terminals (OLTs) to connect to any of the 288 ports individually serving customers. If a customer cancels service, the corresponding splitter port is first deprovisioned, then is re-provisioned by the automated FDH to serve the new customer. This ensures that each splitter in the FDH, as well as the OLT (Optical Line Terminal) in the Central Office (CO), is maximally utilized, thereby reducing overall capital expenditures. The FDH further includes approximately five 1×32 passive fiber optic splitters 120 and splice storage/organizing trays 115 for 72 F1 and 288 F2 fibers, for a total of 360 splices. Typically, the F2 and F1 fibers are in separate Outside Plant (OSP) cables 116, each cable containing a large number of fibers. A typical mechanical footprint of A-FDH is 18"×27" in an enclosure of 42" tall, with F1 and F2 fibers entering the hub from below ground.

F1 side: CO to FDH
    Fiber count to FDH: 24 or 48 fibers
    Fiber count for CO pass throughs: home run or dark fibers 32 fibers
    Total fiber count=48 to 72

Figure 2:
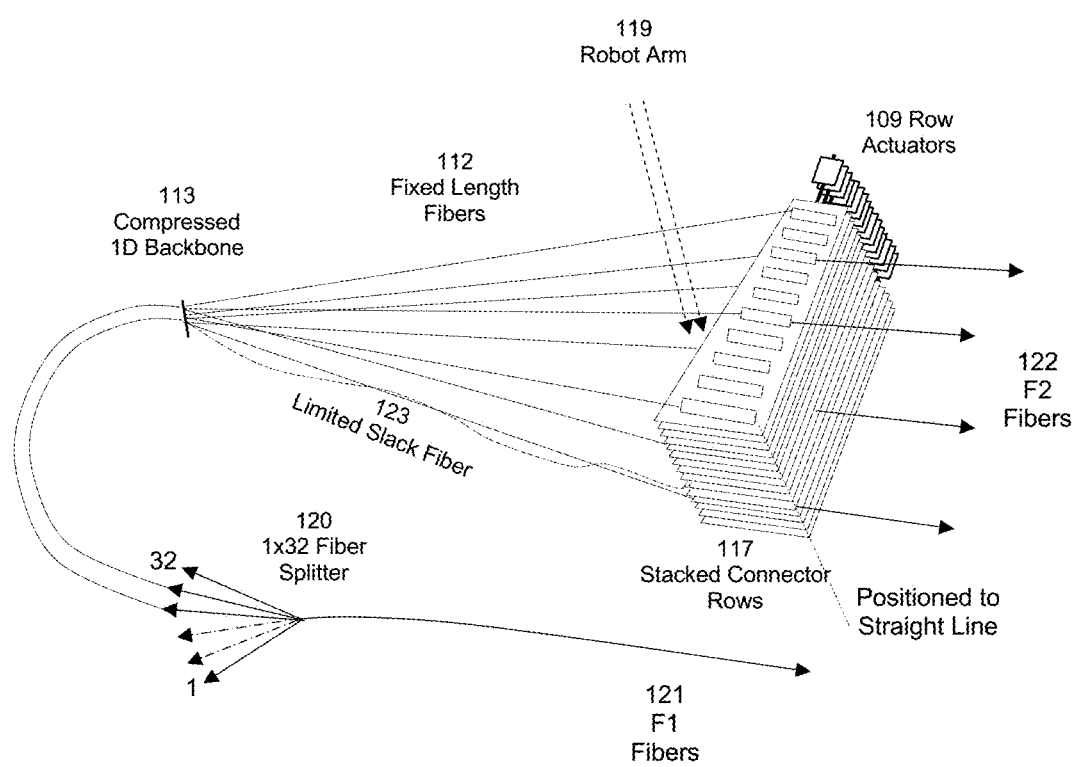
FIG. 2 is a perspective diagram of a fiber interconnect configuration according to exemplary embodiments hereof, utilizing fixed and equal length fibers while maintaining minimal slack fiber in all configurations.
Figure 3:
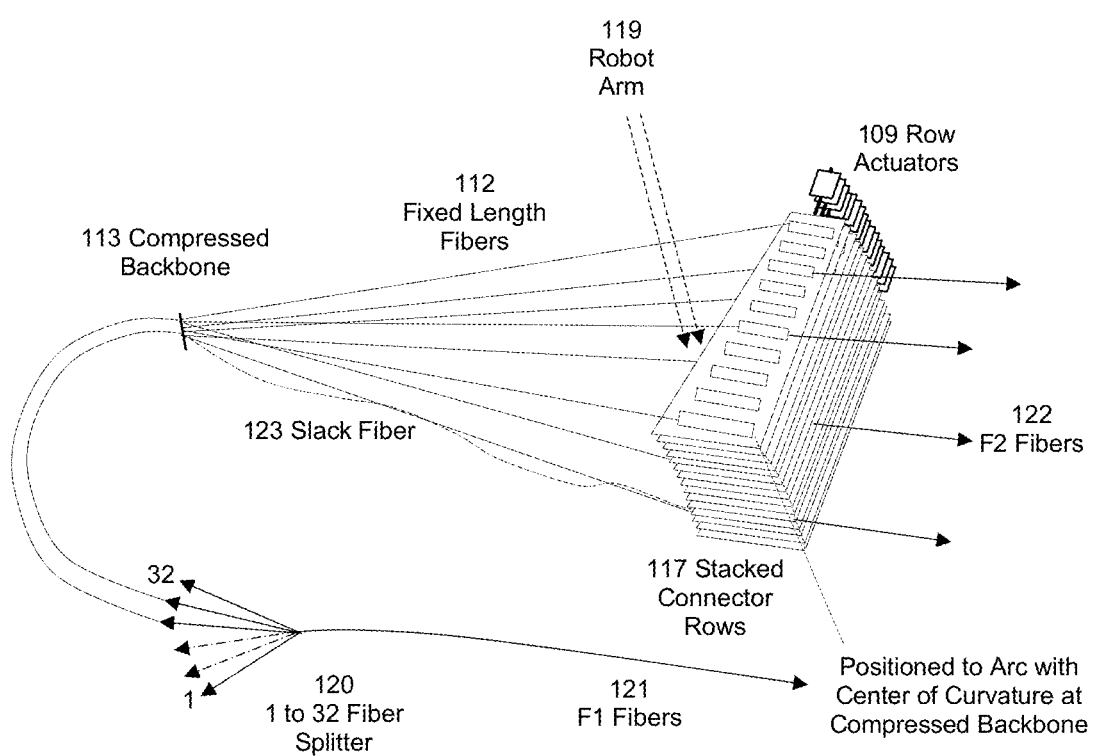
FIG. 3 is a perspective diagram of an alternative fiber interconnect configuration according to exemplary embodiments hereof, that utilizes equal length, suspended fibers fixed at one end and while maintaining minimal slack fiber in all configurations.

F2 side: hub to client
    F2 terminate in fully passive Multi-Services Terminals (MSTs) to breakout cables into individual cables with 12, 8 or 4 ports each, typically the last element upstream to end user
    Fiber count for client lines is 288
    Fibers are spliced within the hub and at the other end (MSTs) are pre-terminated In accordance with some exemplary embodiments hereof, the FDH system 132 may include reconfigurable internal fiber interconnects 112 of fixed and constant length, each suspended at a fixed end from a linearly arranged individual backbone (FIGS. 2, 3). The F2 port locations along the array of linear moveable ports are arranged in a stacked set/connector rows 117 of contiguous multi-port rows. The geometry of this arrangement ensures that the shortest distance from the fiber backbone's origin to the moveable ports is within 5%-10% of the others, for all possible configurations. FIG. 2 illustrates the stacked connector rows 117 aligned so that the common line through the multiplicity of rows is parallel to the line of the 1D backbone.

FIG. 3 illustrates a similar cross-connect system 132 configuration, with the stacked connector rows 117 positioned so that the multiplicity of rows is distributed along an arc out of the plane of the row, with each row the same distance R from the backbone. In this exemplary configuration, the rows are not aligned on top of one another, but are instead slightly shifted from one another. This ensures that internal cross-connect fibers follow substantially straight lines (e.g. slightly curved, but with no loops) when plugged in, to prevent entanglement of fiber strands and eliminating the need for automatic fiber retraction means [U.S. Pat. No. 7,315,681 to Kewitsch].

In general, the need for retractable, self-tensioned fibers to manage substantial slack length variations increases the complexity and size of the system 132. This construction is generally required due to the increased physical size for fiber interconnects 112 with 300 or more ports. For these larger port counts (e.g. 300 or more), the relatively large size of the connector port array makes it challenging to maintain substantially identical fiber lengths. It is important that the system footprint fits within the constraints of standard equipment racks (19"×36") and FDHs (18"×27"). The ratio of fiber length to the transverse position along the opposite array of moveable ports must be sufficiently large for the worst-case fiber slack 123 length to be less than about 5%. Tables 1-2 below illustrate example configurations (FIGS. 7, 8, 9) that enable substantially identical fiber lengths to be achieved so that retractable fibers are not necessary.

TABLE 1

Horizontal Plane, 144 Fibers, 288 Connectors, Connector Rows Aligned to Arc

| % Slack H | Distance from Connector to Backbone | Straight Connector Row Width |
|---|---|---|
| 5% | 66 cm | 42 cm (10 ports) |
| 1.8% | 66 cm | 25.4 cm (10 ports) |

TABLE 1-continued

Horizontal Plane, 144 Fibers, 288 Connectors, Connector Rows Aligned to Arc

| % Slack H | Distance from Connector to Backbone | Straight Connector Row Width |
|---|---|---|
| 5% | 55.9 cm | 35.6 cm (10 ports) |
| 2.5% | 55.9 cm | 25.4 cm (10 ports) |

TABLE 2

Vertical Plane, 144 Fibers, 288 Connectors, Connector Rows Aligned to Line

| % Slack V | Distance from Connector to Backbone | Number of Connector Rows |
|---|---|---|
| 4% | 66 cm | 30 (total of 38 cm tall) |
| 4.8% | 61 cm | 30 |
| 5.6% | 56 cm | 30 |

In some embodiments, to maximize port density within the A-FDH system 132, the internal fibers 112 within the interconnection region may have an 80 micron diameter glass cladding and a 125 micron diameter acrylate coating. At the backbone 113, these fibers converge to a one-dimensional vertical stack of closely packed fibers with backbone height of 36 mm for 288 fibers and 18 mm for 144 fibers. Backbone 113 having reduced height enables a minimal accumulation of fiber slack 123 across the range of potential fiber configurations.

To avoid excessive slack fiber for any particular fiber 112 in all conceivable fiber configurations, all straight-line fiber paths in all cross-connect states should not vary by more than 10%, with less than 5% being optimal. A minimum distance between connector ports and backbone of 66 cm corresponds to a minimum distance from backbone 113 to connector port of 72.6 cm. Up to this maximum distance, the slight rigidity of optical fiber eliminates the potential for looping and tangling within the interconnection region even though there is a 6.6 cm of excess fiber length.

In a particular example of an acceptable internal fiber geometry that meets these conditions, the shortest distance from fiber backbone 113 to connector row is 66 cm. 144 fibers from the backbone 113 are arranged along a line 18 mm long. The connector array comprises ten columns of connectors 130 and 30 rows of connectors, with column horizontal center-to-center spacing equal to 25 mm and vertical row to row stacking of 12.5 mm.

The A-FDH (FIG. 4) consists of a mounting platform, an internal structural frame, a sealed cover, one or more 144 or 288 port internal fiber modules 127, splice trays 150, fiber optic passive splitters 120, a robot 106, cleaning cartridge 107, gripper 105 and electronics 104. This example illustrates the orientation of the robot traveling down columns of the fiber interconnect region parallel to the y direction, the primary travel axis of the robot 106 being parallel to the 1D backbone 113 (also parallel to y direction).

Figure 10:
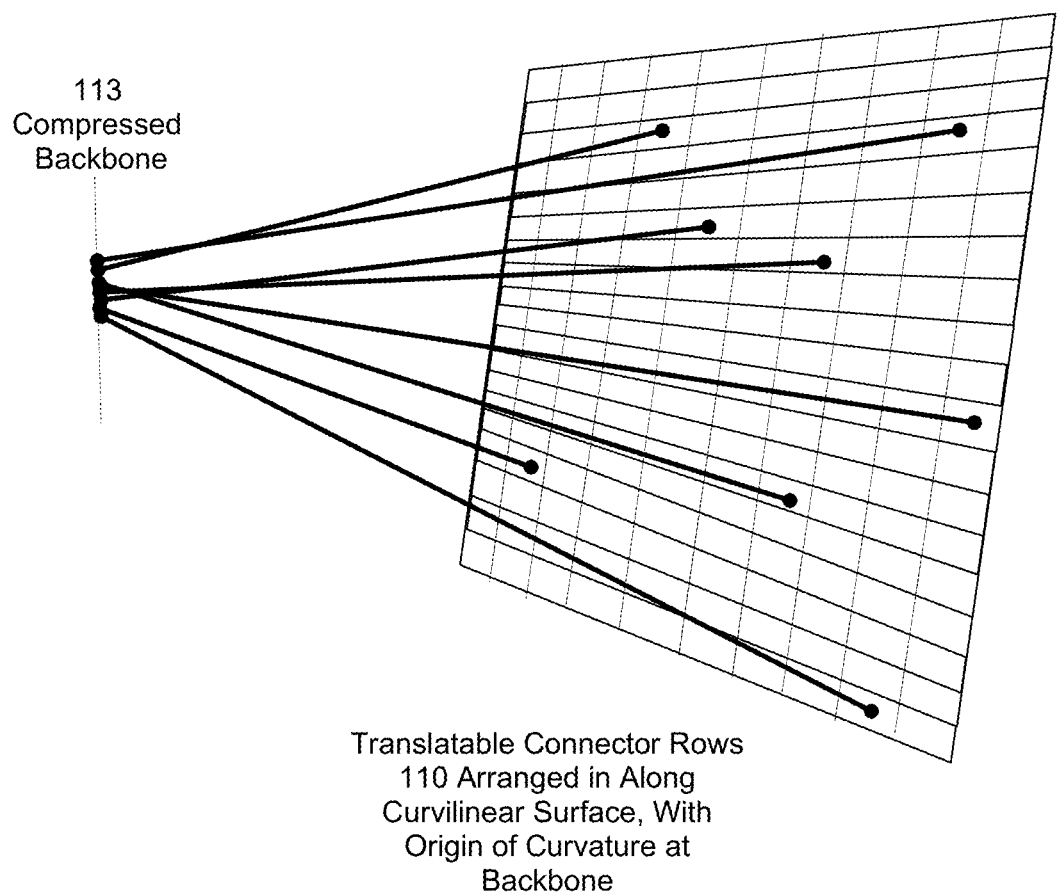
FIG. 10 is a perspective view of interior surface of connector row array, with dust covers inserted in ports without fiber connectors and moveable by the robot gripper to any other port to maintain cleanliness in remote, outdoor locations.

This example has capacity for 288 F2 ports populated with about 144 fiber outputs of the splitter ports. These fibers outputs can be configured to connect to any of the F2 ports. The F2 ports with cables that branch out to customers are typically pre-terminated at the time external cables are installed to the external side of F2 ports. The internal side of F2 ports that do not currently have an internal fiber connector attached would have a dust cap 129 in the place of the connector. To create a connection to a port with a dust cap, the robot gripper 105 first removes the dust cap and moves it to the nearest unused port. The gripper 105 then moves a selected fiber to the open port and establishes the desired low loss optical connection. This rearrangement of dust caps (FIGS. 6 and 10) may be necessary to ensure that unused ports do not collect fiber end-face contaminants such as dust and pollutants. The dust caps 129 are designed to have substantially similar shape as the fiber connector, so that the gripper 105 can plug/unplug both the fiber connector and cap interchangeably.

In some embodiments hereof, the system may be powered by an external ac or dc power supply 101. Alternatively, a battery can be installed within the system. A typical fiber reconfiguration using the robot 106 consumes 0.1 A-hr and a typical battery can supply 100 A-hr. Therefore, a battery could potentially power as many as 1,000 reconfigurations before requiring a recharge.

Figure 7:
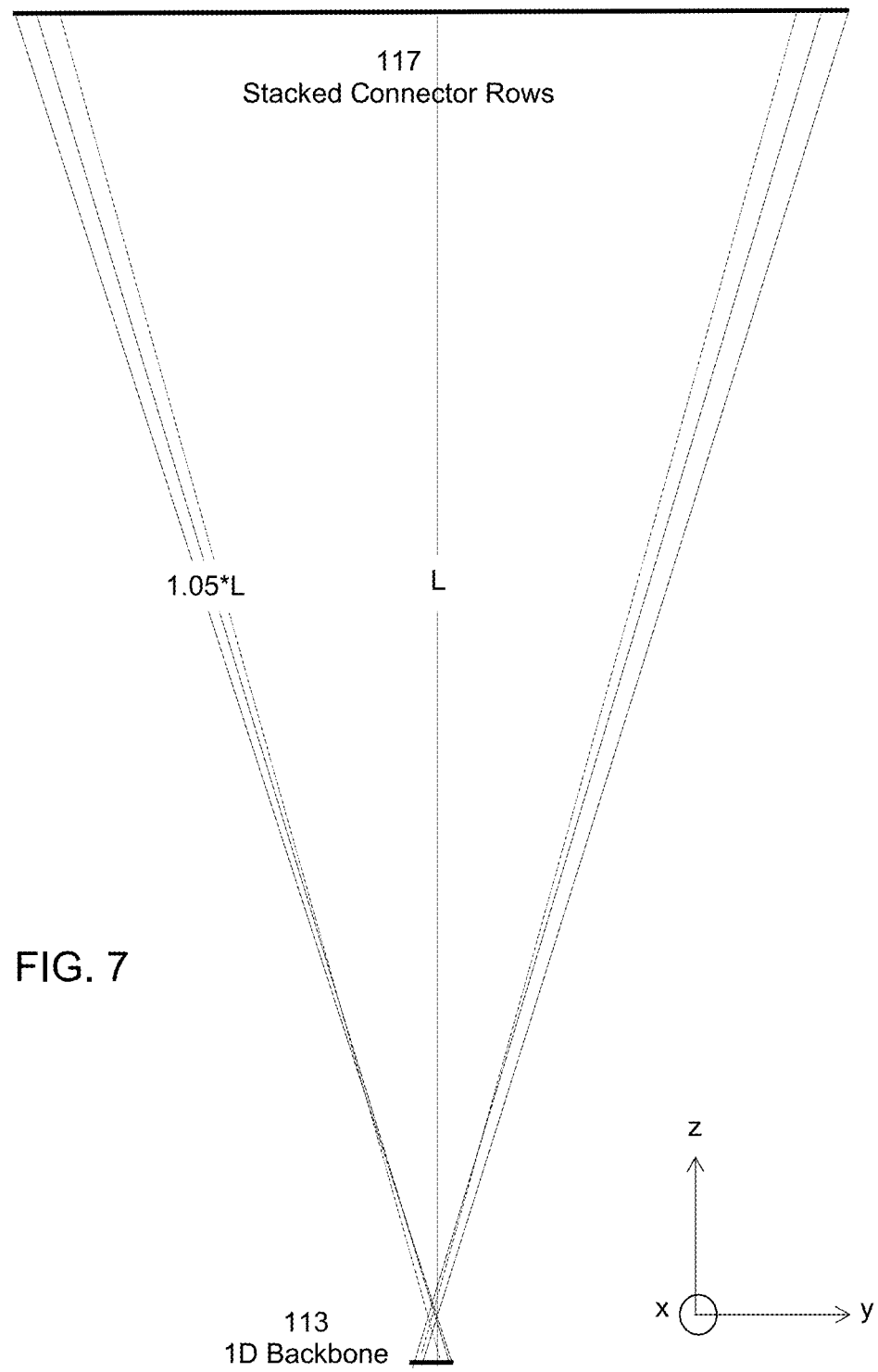
FIG. 7 is a side view of the moveable fibers within the automated FDH according to exemplary embodiments hereof, illustrating an exemplary geometry to accomplish minimal slack buildup for different fiber configurations.

FIG. 7 illustrates a side view of the fiber interconnect section of the A-FDH. Row 0 is the docking row 128, used to transport the fiber undergoing reconfiguration beneath all other fibers in the interconnect volume if it needs to cross intermediate columns on its way to the final destination port. Higher rows are used to make connections to the external fiber optic cables (F2) that extend out of the FDH to individual users. An automated cleaning cartridge 107 may be located above the upper most connector row to allow the end face of internal fiber connectors 130 to be cleaned.

In a further example optimized for higher density, each row has a nominal height of 12 mm, so that 30 rows have a total height of about 36 cm. The height of the backbone 113 comprised of 0.125 mm diameter fiber is only about 144/8=1.8 cm, which is 20 times smaller than the total row height of 36 cm. As a consequence, the fibers from the backbone appear to emanate from effectively a point source. This is a significant advance relative to approaches in which the total backbone height is about equal to the total row height, because the distances for each fiber from the backbone to connector are more substantially identical in embodiments hereof. In this context, substantially identical means each fiber path approximates a line or large radius arc, without any tight bends or loops.

Figure 8:
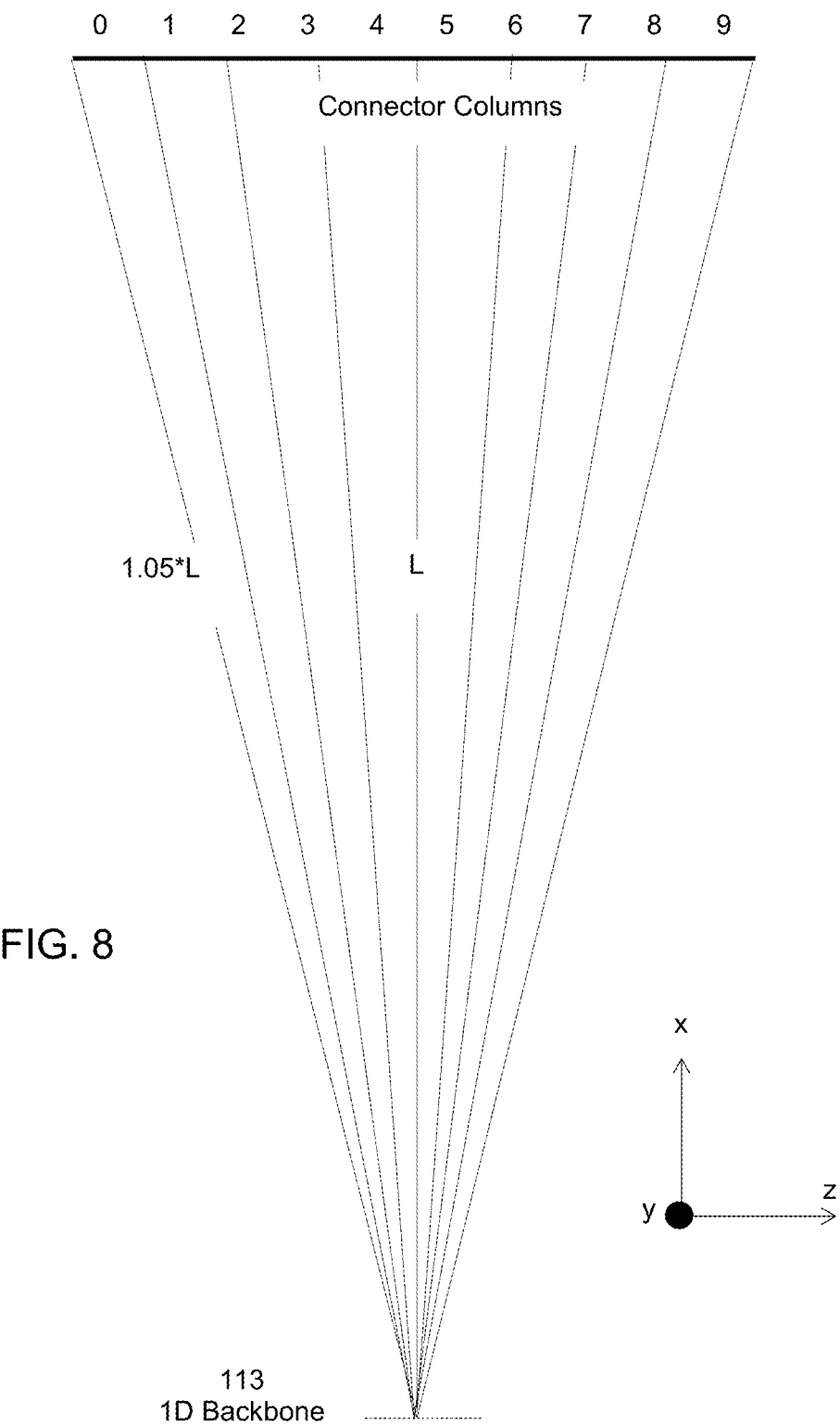
FIG. 8 is a top view of the moveable fibers within the automated FDH according to exemplary embodiments hereof, illustrating an exemplary geometry to accomplish minimal slack buildup for different fiber configurations.

FIG. 8 illustrates a top view of this same fiber interconnection section, in which the interconnect volume is divided into 10 equal width (25.4 mm) columns of fiber optic connectors 130, spanning a linear distance of 20 cm. From the top view, all fibers in the 1D backbone 113 are aligned and appear to emanate from a common vertex.

Figure 9:
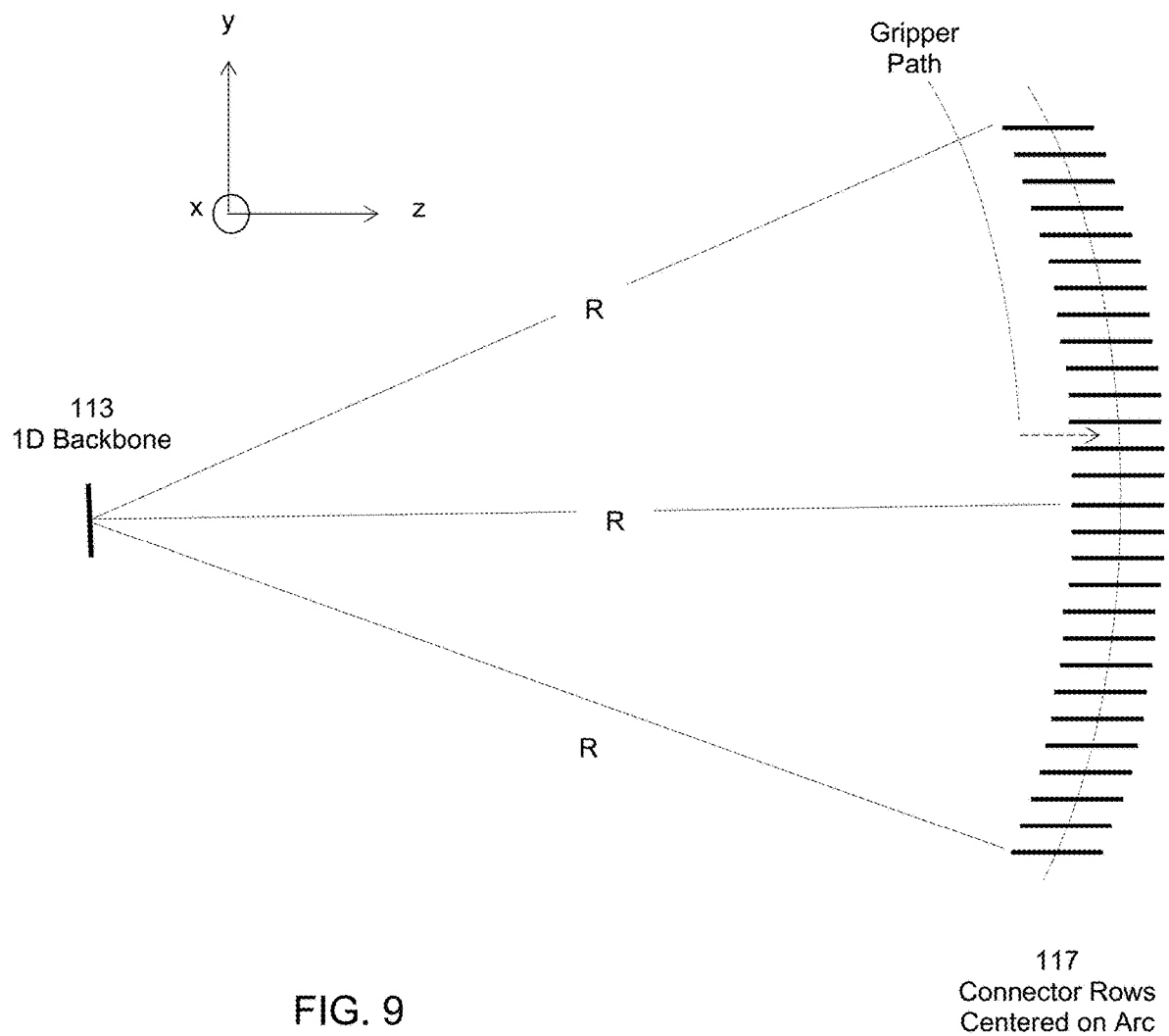
FIG. 9 is a side view of the internal fibers illustrating an exemplary geometry to accomplish minimal slack buildup for different fiber configurations.
Figure 11:
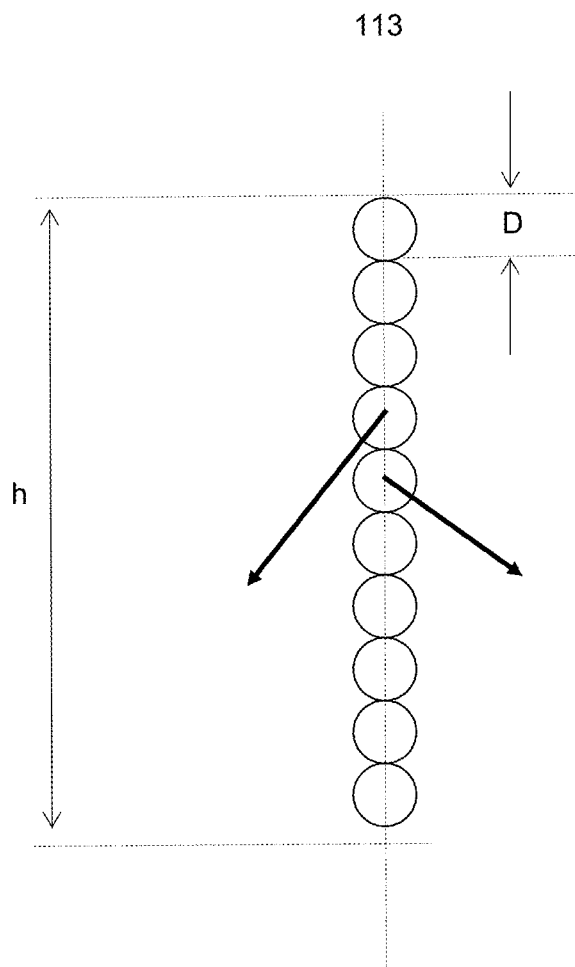
FIG. 11 is a diagram of a compressed fiber backbone according to exemplary embodiments hereof.

FIG. 9 illustrates a side view of an alternative exemplary embodiment, in which the center of the connector rows 110 are positioned along an arc segment of radius R. This further ensures that all fibers have a nominal length R independent of the cross-connect configuration. In this side view, the length of the 1D backbone 113 should be minimized by using small diameter fibers so that the origins of each fiber are no more than a fraction of R apart. A cross-section of the 1D backbone is shown in FIG. 11. In some exemplary embodiments, the outer diameter of each fiber may be 0.125 mm and their tangents may coincide at the backbone 113.

Figure 5:
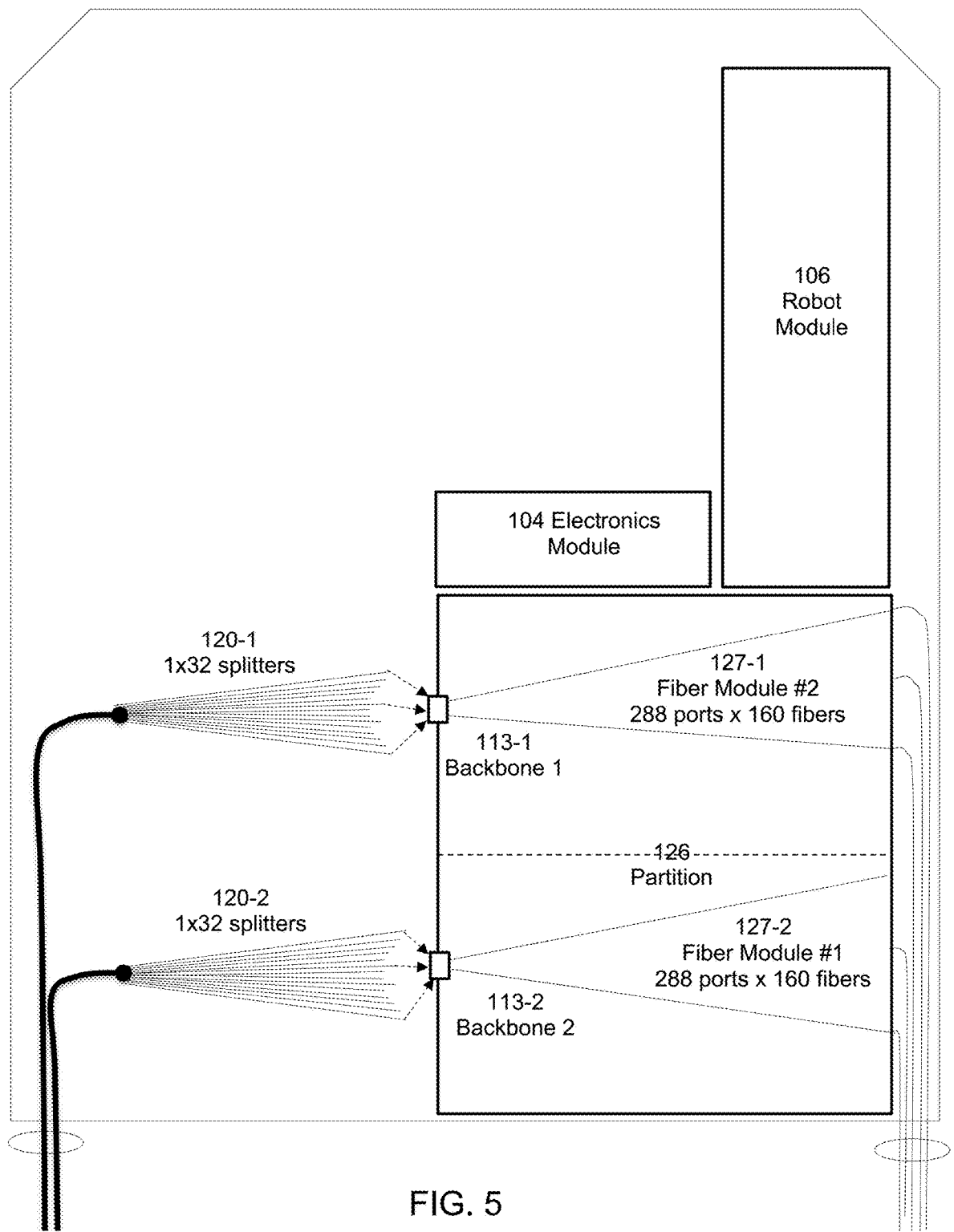
FIG. 5 is a block diagram of an automated FDH according to exemplary embodiments hereof with two separated compressed fiber backbone regions and partitioned fiber interconnects, to provide a greater number of ports while preserving fixed length fibers.

To achieve larger fiber counts within a single unit having one robot 106, the compressed backbone 113 can potentially be divided into two (FIG. 5) or more spaced apart sections, wherein each section is separated by at least 10 times the linear extent of the backbone. In this case, it is necessary to maintain a partition 126 so that fibers from the top backbone segment only interface with the upper half of the F2 connector ports, and the fibers from the bottom backbone 113 segment only interface with the lower half of the F2 connector ports.

Figure 4:
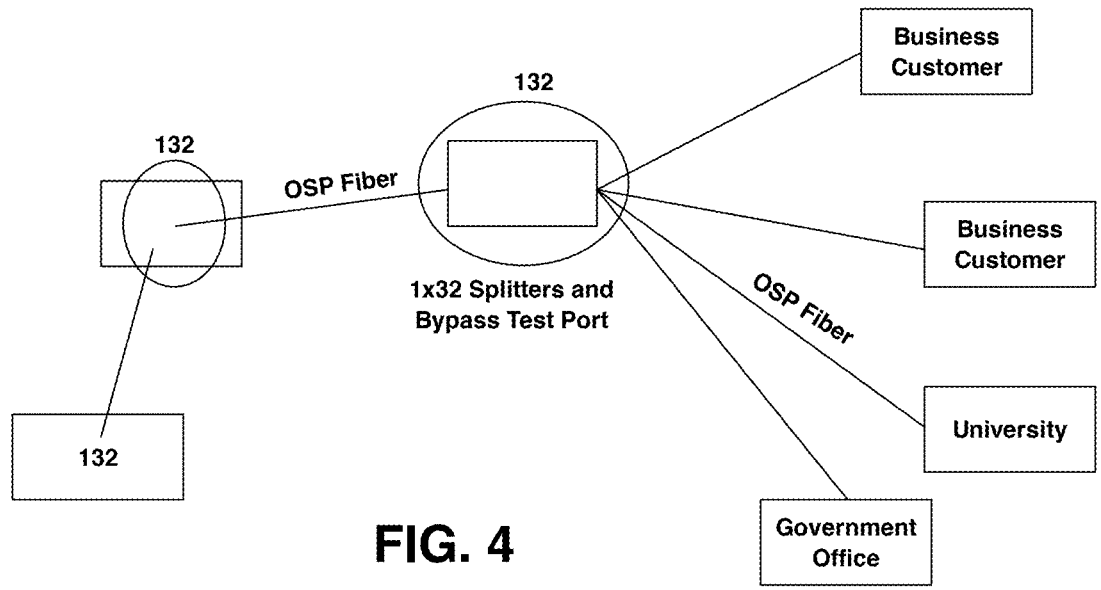
FIG. 4 is a diagram of a passive optical network with FDHs according to exemplary embodiments hereof, in the outside plant, and intermediate distribution point in sending data to and from the CO to end users.

FIG. 4 is an example network application of an A-FDH 124. The A-FDH may be placed outdoors within the neighborhood, either above ground, below ground, or elevated on a pole. The F1 fibers of the A-FDH originate from the CO, which may further include automated patch-panels or an NTM based on embodiments hereof and/or in accordance with U.S. Pat. No. 9,703,060 to Kewitsch. An OTDR attached to an automated cross-connect in the CO enables all fibers to be traced from the CO all the way to the customer demarcation point. To avoid the signal degradation introduced by launching OTDR pulses through the 1×32 splitter, the A-FDH is capable of switching in a test fiber that bypasses the splitter and provides a direct way to interrogate the fiber cable going to each customer. This significantly reduces the time and cost to troubleshoot issues in the Access Networks and Outside Plant (OSP).

Conclusion

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as "about," "around," "generally," "substantially," "essentially," "at least," etc. (i.e., "about 3" shall also cover exactly 3 or "substantially constant" shall also cover exactly constant).

Those of ordinary skill in the art will realize and appreciate, upon reading this description, that the term "substantially identical length" means the same length, within ±10%, preferably within ±5%. Similarly, as used herein, the term "substantially straight" means "straight," within ±10%, preferably within ±5%; and the term "substantially equidistant" (or "substantially equal distance") means "equidistant" within ±10%, preferably within ±5%; and "without substantially bending" means "without bending more than 10%, preferably without bending more than 5%. Thus, in general, as used herein, including in the claims, the term "substantially" when applied to a property (e.g., length, straightness, equality, distance, shape, etc.) means within 10 percent, and preferably within 5 percent of that property.

Use of exemplary language, such as "for instance", "such as", "for example" ("e.g.,") and the like, is merely intended to better illustrate the invention and does not indicate a limitation on the scope of the invention unless specifically so claimed.

Those skilled in the art will readily observe that numerous modifications and alterations of the system and apparatus may be made while retaining the teachings of the invention. Accordingly, the above disclosure should be construed as limited only by the metes and bounds of the appended claims.

LEGEND

101 Electrical Power Supply
102 Network Controller
103 Communications
104 Electronics
105 Gripper
106 Robot
107 Cleaning Cartridge
108 Active Assembly
109 Connector Row Actuator
110-i Connector Row i
111 Passive Assembly
112 Interconnects
113 Backbone
115 Splice Trays
116 OSP Cables
117 Stacked Connector Rows
119 Robot Arm
120 Fiber Splitter
121 F1 Fibers
122 F2 Fibers
123 Fiber with Slack
124 Fiber Cross-Connect
126 Partition
127 Fiber Module
128 Docking Row
129 Dust Cap
130 Connectors
131 External Interface to Connector Terminals

I claim:

1. A fiber optic strand distribution system utilizing a fiber optic reconfiguration robot moving in xyz directions within a fiber interconnect zone, the system comprising:
    a multiplicity of substantially equal length, substantially straight-line fiber strands in an x-z plane within the fiber interconnect zone;
    each fiber strand having a fixed, central point that lies in proximity to adjacent fiber strands at a distal end located within a linear, central compressed fiber backbone oriented parallel to a y axis; and
    each fiber strand having a moveable endpoint at a proximal end when engaged by the reconfiguration robot, wherein said moveable endpoint is moveable between rearrangeable terminal locations along a partial spherical surface that is substantially equidistant from a midpoint of the linear, central compressed fiber backbone, and
    wherein the reconfiguration robot carries the moveable endpoint of the fiber strand according to a non-repeating braid algorithm and between terminal locations.

2. The system of claim 1, wherein the reconfiguration robot carries the moveable endpoint of the fiber strand without physically colliding with other fiber strands.

3. The system of claim 1, wherein the terminal locations lie along a curvilinear surface substantially constant and substantially equal distance from the linear, central compressed fiber backbone.

4. The system of claim 3, wherein sets of terminal locations are attached to a common, rigid substrate.

5. The system of claim 3, wherein the terminal location comprises a stacked arrangement of one or more sets of terminal locations, the terminal locations of each set being distributed in fixed relation to one another along an arc.

6. The system of claim 5, wherein each set of terminal locations is independently rotatable about a common central axis relative to other sets of terminal locations positioned above or below.

7. The system of claim 5, wherein a multiplicity of fiber strands is physically merged or fused into a single fiber on a side of the compressed fiber backbone opposite the fiber moveable endpoints.

8. The system of claim 7, wherein the multiplicity is in the range 2 to 32.

9. The system of claim 1, wherein the fiber strands are terminated with male LC fiber optic connectors and the terminals comprise female LC union adapters.

10. A method to automate spatial rearrangement of a dense arrangement of substantially straight fiber optic interconnects of substantially equal lengths along a central location, and plugged into a multi-segmented curved terminal panel,
    the central location spanning a fixed one-dimensional compressed fiber backbone, wherein each fiber potentially crosses other fibers with no entanglement within the central location,
    said spatial rearrangement performed by a robot moving in a coordinated sequence of steps according to a non-repeating braid algorithm, to rearrange any of a multiplicity of fixed, identical-length optical fibers,
    wherein the method comprises:
    unplugging a connector at one end of an optical fiber at the multi-segmented curved terminal panel;
    moving the connector in spaces between adjacent connectors; and
    plugging in the connector at a different location within the multi-segmented curved terminal panel.

11. The method of claim 10, further comprising:
    cleaning an end face of the optical fiber prior to plugging in the connector at said different location.

12. The method of claim 11, wherein the end face of the optical fiber is cleaned immediately prior to plugging in the connector at said different location.

13. The method of claim 10, wherein the optical fibers have sufficiently high stiffness and sufficiently low excess length to prevent formation of a loop that could tangle with other strands.

14. The method of claim 10, further including:
    moving the multi-segmented curved terminal panel in a direction orthogonal to the direction of the robot moving in a coordinated sequence.

15. A system comprising a multiplicity of fibers with substantially straight-line fiber interconnects of equal length along a central location, the central location spanning a fixed one-dimensional compressed fiber backbone and a two-dimensional curved array of reconfigurable endpoint locations, wherein each fiber potentially crosses other fibers with no entanglement within the central location.

16. The system of claim 15, wherein each fiber of the multiplicity of fibers is movable by a robot within a surrounding multiplicity of fibers without substantially bending the other fibers.

17. The system of claim 16, wherein each substantially straight-line fiber interconnect includes a connector that inserts within reconfigurable endpoint locations.

18. The system of claim 17, wherein each fiber is substantially cylindrical, with 80 to 125-micron outer diameter glass, 125 to 250 micron outer plastic coating, and length of 25 to 500 cm.

19. The system of claim 18, wherein the fiber interconnect lengths are identical to within 5% of an average length of the multiplicity of fibers in the central location.

20. The system of claim 15, wherein a ratio of length of fiber in the central location to connector array height is greater than 2.

21. The system of claim 15, wherein a center of curvature of the two-dimensional curved array lies on the compressed fiber backbone.

22. The system of claim 21, wherein a ratio of a length of fiber in the central location to compressed fiber backbone height is greater than 10.

23. The system of claim 22, wherein the compressed fiber backbone comprises a stacked linear array of reduced outer diameter optical fiber.

24. The system of claim 23, wherein the compressed fiber backbone height is less than 3 cm.

\* \* \* \* \*